United States Patent
Kim et al.

(10) Patent No.: US 11,965,080 B2
(45) Date of Patent: Apr. 23, 2024

(54) METHOD OF PREPARING CARBOXYLIC ACID-MODIFIED NITRILE-BASED COPOLYMER LATEX

(71) Applicant: LG Chem, Ltd., Seoul (KR)

(72) Inventors: Jung Eun Kim, Daejeon (KR); Ji Hyun Kim, Daejeon (KR); Won Sang Kwon, Daejeon (KR); Myung Su Jang, Daejeon (KR); Seung Whan Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 506 days.

(21) Appl. No.: 17/299,571

(22) PCT Filed: Aug. 12, 2020

(86) PCT No.: PCT/KR2020/010680
§ 371 (c)(1),
(2) Date: Jun. 3, 2021

(87) PCT Pub. No.: WO2021/071078
PCT Pub. Date: Apr. 15, 2021

(65) Prior Publication Data
US 2022/0056247 A1    Feb. 24, 2022

(30) Foreign Application Priority Data

Oct. 7, 2019    (KR) .................. 10-2019-0123894
Jun. 11, 2020    (KR) .................. 10-2020-0070902

(51) Int. Cl.
| | |
|---|---|
| C08L 13/02 | (2006.01) |
| B29C 41/00 | (2006.01) |
| B29C 41/14 | (2006.01) |
| B29C 41/46 | (2006.01) |
| C08J 5/02 | (2006.01) |
| B29K 105/00 | (2006.01) |
| B29L 31/48 | (2006.01) |

(52) U.S. Cl.
CPC .......... *C08L 13/02* (2013.01); *B29C 41/003* (2013.01); *B29C 41/14* (2013.01); *B29C 41/46* (2013.01); *C08J 5/02* (2013.01); *B29K 2105/0064* (2013.01); *B29L 2031/4864* (2013.01); *C08J 2313/02* (2013.01); *C08L 2312/00* (2013.01)

(58) Field of Classification Search
USPC ........................................................ 524/821
See application file for complete search history.

(56) References Cited

U.S. PATENT DOCUMENTS

| | | | |
|---|---|---|---|
| 4,694,057 A | 9/1987 | Smith et al. | |
| 5,869,589 A | 2/1999 | Raynolds et al. | |
| 5,919,716 A | 7/1999 | Raynolds et al. | |
| 8,044,138 B2 * | 10/2011 | Han ...... | C08F 236/12 |
| | | | 526/341 |
| 2005/0154122 A1 | 7/2005 | Ota et al. | |
| 2009/0318605 A1 | 12/2009 | Dyllick-Brenzinger et al. | |
| 2011/0229646 A1 * | 9/2011 | Kim ...... | C08L 13/02 |
| | | | 524/821 |
| 2017/0218142 A1 | 8/2017 | Foo et al. | |
| 2018/0016409 A1 | 1/2018 | Liou | |
| 2018/0230297 A1 | 8/2018 | Kwon et al. | |
| 2019/0185641 A1 | 6/2019 | Kim et al. | |
| 2020/0255634 A1 | 8/2020 | Wei et al. | |

FOREIGN PATENT DOCUMENTS

| | | |
|---|---|---|
| CN | 1128765 A | 8/1996 |
| CN | 105733455 A | 7/2016 |
| CN | 108884276 A | 11/2018 |
| CN | 109790328 A | 5/2019 |
| JP | S56093721 A | 7/1981 |
| JP | 2001502366 A | 2/2001 |
| JP | 2003342303 A | 12/2003 |
| JP | 3977436 B2 | 9/2007 |
| JP | 2010504385 A | 2/2010 |
| JP | 4466767 B2 | 5/2010 |
| JP | 20189272 A | 1/2018 |
| JP | 2018513222 A | 5/2018 |
| JP | 2019504924 A | 2/2019 |
| KR | 930007691 B1 | 8/1993 |
| KR | 101070687 B1 | 10/2011 |
| KR | 20120129367 A | 11/2012 |
| KR | 20150010221 A | 1/2015 |
| KR | 20170062730 A | 6/2017 |
| KR | 20180066819 A | 6/2018 |
| KR | 20190022501 A | 3/2019 |

OTHER PUBLICATIONS

Search report from International Application No. PCT/KR2020/010680, dated Nov. 18, 2020.
Search Report dated Feb. 23, 2023 from the Office Action for Chinese Application No. 202080006750.3 dated Feb. 24, 2023, 3 pages. [See p. 1-2, categorizing the cited references].

* cited by examiner

*Primary Examiner* — Fred M Teskin
(74) *Attorney, Agent, or Firm* — Lerner David LLP

(57) ABSTRACT

A method of preparing a carboxylic acid-modified nitrile-based copolymer latex is provided. The method of preparing a carboxylic acid-modified nitrile-based copolymer later includes emulsion-polymerizing a monomer mixture including a conjugated diene-based monomer, an ethylenically unsaturated nitrile-based monomer, and an ethylenically unsaturated acid monomer in the presence of a cross-linking agent including glyoxal.

14 Claims, 1 Drawing Sheet

[FIG. 1]
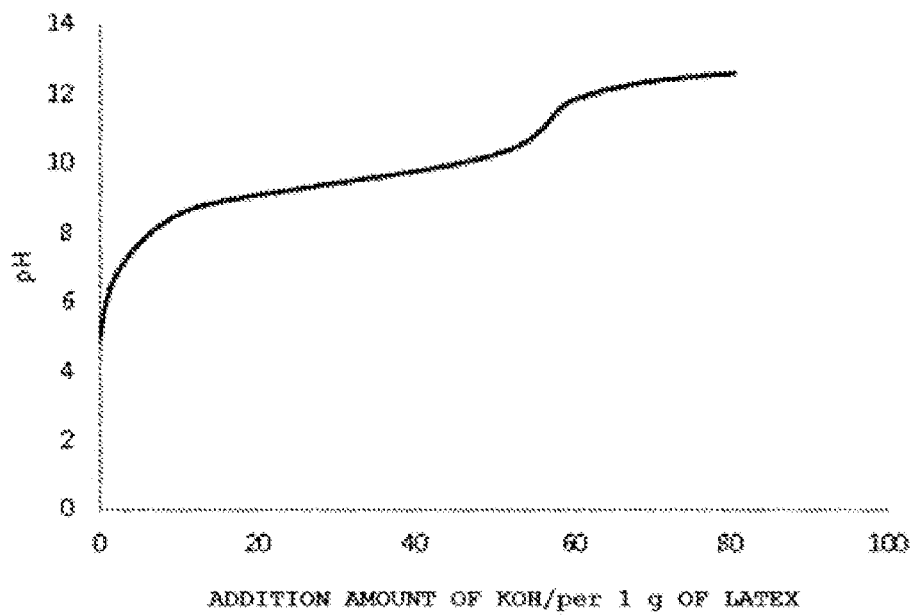
[FIG. 2]
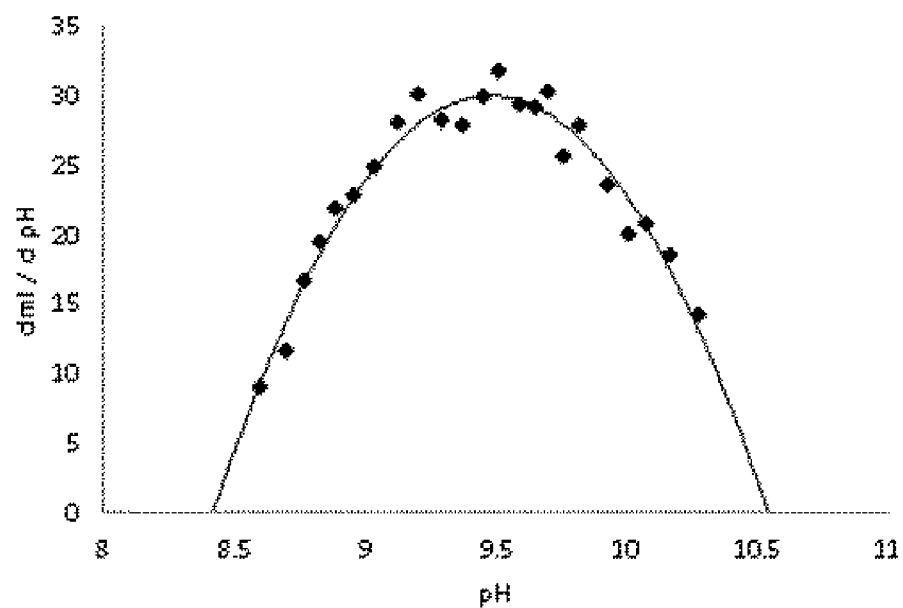

METHOD OF PREPARING CARBOXYLIC ACID-MODIFIED NITRILE-BASED COPOLYMER LATEX

CROSS-REFERENCE TO RELATED APPLICATIONS

The present application is a national stage entry under 35 U.S.C. § 371 of International Application No. PCT/KR2020/010680 filed on Aug. 12, 2020, which claims priority to Korean Patent Application No. 10-2019-0123894, filed on Oct. 7, 2019 and Korean Patent Application No. 10-2020-0070902, filed on Jun. 11, 2020, the entire contents of which are incorporated herein by reference.

TECHNICAL FIELD

The present invention relates to a method of preparing a carboxylic acid-modified nitrile-based copolymer latex, and more particularly, to a method of preparing a carboxylic acid-modified nitrile-based copolymer latex, a copolymer latex prepared using the same, a latex composition for dip molding including the copolymer latex, and a molded article produced from the latex composition for dip molding.

BACKGROUND ART

A disposable rubber glove widely used in daily life including housework, the food industry, the electronic industry, and medical fields, is made by dip molding of a natural rubber or a carboxylic acid-modified nitrile-based copolymer latex. Recently, carboxylic acid-modified nitrile-based gloves have been spotlighted in the market of disposable gloves due to an allergic reaction to a natural protein of a natural rubber and unstable supply and demand.

Meanwhile, there have been various attempts to increase glove productivity in response to growing demand for gloves. Among these attempts, the most common approach is to produce a thin glove while maintaining its strength. In the past, disposable nitrile gloves having a weight of about 4 g have been generally used, although it is now required to provide gloves which are made thinner to have a weight of about 3.2 g and exhibit tensile strength of 6 N or more. A molded glove article is produced by using a coagulant having a low concentration and a latex composition to produce such a thin glove. In this case, workability such as syneresis is deteriorated.

Another attempt to increase the glove productivity is to increase a line speed, but in this case, high workability is also required.

As such, latex having both high strength and excellent workability is required, but in reality, strength and workability of a glove have a trade-off relationship. The strength and workability of the glove are determined by a film formation speed of latex. When the film formation speed is high, a glove has high strength, but the workability of the glove is deteriorated. On the contrary, when the film formation speed is low, the workability of the glove is excellent, but a glove having low strength is made. Therefore, development of a carboxylic acid-modified nitrile-based copolymer latex being capable of ensuring high tensile strength and having excellent workability even though it is made to be thin in a high speed production line has been required.

DISCLOSURE

Technical Problem

In order to solve the problems mentioned in the background art, an object of the present invention is to provide a carboxylic acid-modified nitrile-based copolymer latex by which a molded article having high tensile strength and elongation even though it has a thin thickness and a latex composition for dip molding having excellent workability may be prepared.

That is, an object of the present invention is to obtain a carboxylic acid-modified nitrile-based copolymer having a cross-link density improved by performing emulsion polymerization in the presence of a cross-linking agent including glyoxal, and forming a uniform cross-link site in a copolymer when preparing a carboxylic acid-modified nitrile-based copolymer latex.

In addition, in the present invention, a soluble monomer and an ethylenically unsaturated acid monomer are partially polymerized in water in the presence of a cross-linking agent including glyoxal and a specific polymerization initiator and initial activator when preparing a carboxylic acid-modified nitrile-based copolymer latex, to produce a water soluble oligomer at an initial stage of polymerization, thereby preparing a carboxylic acid-modified nitrile-based copolymer latex in which a pKa of carboxylic acid is in a specific range. A latex composition for dip molding including the prepared carboxylic acid-modified nitrile-based copolymer latex has excellent workability, and a molded article produced from the latex composition for dip molding has excellent tensile strength.

Technical Solution

In one general aspect, a method of preparing a carboxylic acid-modified nitrile-based copolymer latex includes emulsion-polymerizing a monomer mixture including a conjugated diene-based monomer, an ethylenically unsaturated nitrile-based monomer, and an ethylenically unsaturated acid monomer in the presence of a cross-linking agent including glyoxal.

In another general aspect, a carboxylic acid-modified nitrile-based copolymer latex includes a carboxylic acid-modified nitrile-based copolymer including a conjugated diene-based monomer-derived repeating unit, an ethylenically unsaturated nitrile-based monomer-derived repeating unit, an ethylenically unsaturated acid monomer-derived repeating unit, and a glyoxal-derived part.

In still another general aspect, a carboxylic acid-modified nitrile-based copolymer latex includes a carboxylic acid-modified nitrile-based copolymer including a conjugated diene-based monomer-derived repeating unit, an ethylenically unsaturated nitrile-based monomer-derived repeating unit, an ethylenically unsaturated acid monomer-derived repeating unit, a water soluble monomer-derived repeating unit, and a glyoxal-derived part, wherein a pKa is 8.5 to 9.5.

In still another general aspect, a latex composition for dip molding includes the carboxylic acid-modified nitrile-based copolymer latex.

In still another general aspect, a dip-molded article includes a layer derived from the latex composition for dip molding.

Advantageous Effects

According to the present invention, emulsion polymerization is performed in the presence of a cross-linking agent including glyoxal to form a uniform cross-link site in a polymer when preparing a carboxylic acid-modified nitrile-based copolymer latex, such that a carboxylic acid-modified nitrile-based copolymer having an improved cross-link density may be obtained.

In addition, in the present invention, a soluble monomer and an ethylenically unsaturated acid monomer are partially polymerized in water in the presence of a cross-linking agent including glyoxal and a specific polymerization initiator and initial activator when preparing a carboxylic acid-modified nitrile-based copolymer latex, to produce a water soluble oligomer at an initial stage of polymerization, thereby preparing a carboxylic acid-modified nitrile-based copolymer latex in which a pKa of carboxylic acid is low. A latex composition for dip molding including the prepared carboxylic acid-modified nitrile-based copolymer latex may have excellent workability, and a molded article produced from the latex composition for dip molding may have excellent tensile strength.

DESCRIPTION OF DRAWINGS

FIG. 1 is a graph showing a pH change according to an addition amount of KOH in Example 1.

FIG. 2 is a derivative curve of the addition amount of KOH according to the pH illustrated in FIG. 1.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

Hereinafter, the present invention will be described in more detail in order to assist in the understanding of the present invention.

The terms "-derived repeating unit" and "-derived part" in the present invention may refer to a component or structure derived from a certain material or the material itself. As a specific example, the term "-derived repeating unit" may refer to a repeating unit formed in a polymer by an added monomer participating in a polymerization reaction during polymerization of a polymer. The term "-derived part" may induce a chain transfer reaction of a polymer by an added chain transfer agent participating in a polymerization reaction during polymerization of a polymer.

The term "latex" in the present invention may refer to that a polymer or a copolymer polymerized by polymerization is present in a form dispersed in water. As a specific example, term "latex" may refer to that fine particles of a rubber-like polymer or fine particles of a rubber-like copolymer polymerized by emulsion polymerization are present in a colloidal state in which the fine particles are dispersed in water.

The term "layer derived" in the present invention may refer to a layer formed from a polymer or a copolymer. As a specific example, the term "layer derived" may refer to a layer formed from a polymer or a copolymer by attaching, fixing, and/or polymerizing the polymer or the copolymer on a dip molding mold when producing a dip-molded article.

According to the present invention, there is provided a method of preparing a carboxylic acid-modified nitrile-based copolymer latex. The method of preparing the carboxylic acid-modified nitrile-based copolymer latex may include emulsion-polymerizing a monomer mixture including a conjugated diene-based monomer, an ethylenically unsaturated nitrile-based monomer, and an ethylenically unsaturated acid monomer in the presence of a cross-linking agent including glyoxal.

According to an exemplary embodiment of the present invention, the conjugated diene-based monomer may include one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene or isoprene, and as a more specific example, the conjugated diene-based monomer may be 1,3-butadiene.

A content of the conjugated diene-based monomer may be 35 wt % to 75 wt %, 40 wt % to 75 wt %, or 45 wt % to 70 wt %, with respect to a total content of the monomer mixture. Within these ranges, a dip-molded article may be flexible and have not only an excellent texture and wearability but also an excellent oil resistance and tensile strength.

According to an exemplary embodiment of the present invention, the ethylenically unsaturated nitrile-based monomer may include one or more selected from the group consisting of acrylonitrile, methacrylonitrile, fumaronitrile, α-chloronitrile, and α-cyanoethylacrylonitrile. As a specific example, the ethylenically unsaturated nitrile-based monomer may be acrylonitrile or methacrylonitrile, and as a more specific example, the ethylenically unsaturated nitrile-based monomer may be acrylonitrile.

A content of the ethylenically unsaturated nitrile-based monomer may be 20 wt % to 50 wt %, 25 wt % to 45 wt %, or 25 wt % to 40 wt %, with respect to the total content of the monomer mixture. Within these ranges, the dip-molded article may be flexible and have not only an excellent texture and wearability but also an excellent oil resistance and tensile strength.

According to an exemplary embodiment of the present invention, the ethylenically unsaturated acid monomer may be an ethylenically unsaturated monomer having an acid group such as a carboxyl group, a sulfonic acid group, or an acid anhydride group. As a specific example, the ethylenically unsaturated acid monomer may be one or more selected from the group consisting of an ethylenically unsaturated acid monomer such as acrylic acid, methacrylic acid, itaconic acid, maleic acid, or fumaric acid; polycarboxylic acid anhydride such as maleic acid anhydride or citraconic acid anhydride; an ethylenically unsaturated sulfonic acid monomer such as styrenesulfonic acid; and a partial ester monomer of ethylenically unsaturated polycarboxylic acid, such as monobutyl fumarate, monobutyl maleate, or mono-2-hydroxypropyl maleate. As a more specific example, the ethylenically unsaturated acid monomer may be one or more selected from the group consisting of acrylic acid, methacrylic acid, itaconic acid, maleic acid, and fumaric acid. As a still more specific example, the ethylenically unsaturated acid monomer may be methacrylic acid. The ethylenically unsaturated acid monomer may be used in a form of a salt such as an alkali metal salt or an ammonium salt during polymerization.

A content of the ethylenically unsaturated acid monomer may be 2 wt % to 15 wt %, 3 wt % to 9 wt %, or 4 wt % to 7 wt %, with respect to the total content of the monomer mixture. Within these ranges, the dip-molded article may be flexible and have not only an excellent wearability but also an excellent polymerization stability and tensile strength.

According to an exemplary embodiment of the present invention, the monomer mixture may include a water soluble monomer. The water soluble monomer may react with the ethylenically unsaturated acid monomer in the presence of a cross-linking agent including glyoxal, and a persulfate-based polymerization initiator and an initial activator that will be described below when polymerizing a carboxylic acid-modified nitrile-based copolymer to form a water soluble oligomer.

The water soluble monomer may include one or more selected from the group consisting of hydroxyethyl acrylate, hydroxyethyl methacrylate, hydroxypropyl methacrylate, dimethylaminoethyl acrylate, and diethylaminoethyl methacrylate.

A content of the water soluble monomer may be 0.1 wt % to 10 wt %, 0.1 wt % to 8 wt %, or 0.3 wt % to 5 wt %, with respect to the total content of the monomer mixture. Within these ranges, workability and polymerization stability may be improved.

According to an exemplary embodiment of the present invention, the conjugated diene-based monomer, the ethylenically unsaturated nitrile-based monomer, and the ethylenically unsaturated acid monomer may be copolymerized by emulsion polymerization of the monomer mixture including the conjugated diene-based monomer, the ethylenically unsaturated nitrile-based monomer, and the ethylenically unsaturated acid monomer, and thus, a carboxylic acid-modified nitrile-based copolymer may be prepared.

According to an exemplary embodiment of the present invention, the conjugated diene-based monomer, the ethylenically unsaturated nitrile-based monomer, the ethylenically unsaturated acid monomer, and the water soluble monomer may be copolymerized by emulsion polymerization of the monomer mixture including the conjugated diene-based monomer, the ethylenically unsaturated nitrile-based monomer, the ethylenically unsaturated acid monomer, and the water soluble monomer, and thus, a carboxylic acid-modified nitrile-based copolymer may be prepared.

According to an exemplary embodiment of the present invention, the monomer mixture may further include an ethylenically unsaturated monomer formed as another ethylenically unsaturated monomer copolymerizable with the ethylenically unsaturated nitrile-based monomer and the ethylenically unsaturated acid monomer.

The ethylenically unsaturated monomer may be one or more selected from the group consisting of a vinyl aromatic monomer selected from the group consisting of styrene, arylstyrene, and vinyl naphthalene; fluoroalkyl vinyl ether such as fluoro ethyl vinyl ether; an ethylenically unsaturated amide monomer selected from the group consisting of (meth)acrylamide, N-methylol (meth)acrylamide, N,N-dimethylol (meth)acrylamide, N-methoxymethyl (meth)acrylamide, and N-propoxymethyl (meth)acrylamide; a non-conjugated diene monomer such as vinyl pyridine, vinyl norbornene, dicyclopentadiene, or 1,4-hexadiene; and an ethylenically unsaturated carboxylic acid ester monomer selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylamino ethyl (meth)acrylate.

A content of the ethylenically unsaturated monomer may be within 20 wt %, 0.01 wt % to 20 wt %, or 0.01 wt % to 15 wt %, with respect to the total content of the monomer mixture. Within these ranges, the dip-molded article may have not only an excellent texture and wearability but also an excellent tensile strength.

According to an exemplary embodiment of the present invention, the emulsion-polymerizing of the monomer mixture including the conjugated diene-based monomer, the ethylenically unsaturated nitrile-based monomer, and the ethylenically unsaturated acid monomer may be performed in the presence of the cross-linking agent including glyoxal, such that a uniform cross-link site may be formed in the carboxylic acid-modified nitrile-based copolymer, thereby increasing a cross-link density of the copolymer.

In a case of a rubber polymer, as a cross-link density is increased, tensile strength is increased, but when the cross-link density is too high, elongation is decreased. As described above, in a case where the emulsion polymerization is performed in the presence of the cross-linking agent including glyoxal, the cross-link density in the copolymer is increased by adequately adjusting the cross-link density, such that a molded article produced from the copolymer has improved tensile strength and an excellent elongation.

According to an exemplary embodiment of the present invention, in the emulsion polymerization, the cross-linking agent including glyoxal may be added, as a cross-linking agent, in an amount of 0.1 parts by weight to 1 part by weight with respect to a total of 100 parts by weight of the monomer mixture. In the polymerization, the cross-linking agent including glyoxal is added within the above range, such that the cross-link density between latex particles is increased, thereby further increasing the strength of the molded article including the cross-linking agent.

According to an exemplary embodiment of the present invention, the emulsion-polymerizing of the monomer mixture including the conjugated diene-based monomer, the ethylenically unsaturated nitrile-based monomer, the ethylenically unsaturated acid monomer, and the water soluble monomer may be performed in the presence of a persulfate-based polymerization initiator including one or more selected from the group consisting of sodium persulfate, potassium persulfate, and ammonium persulfate; an initial activator including one or more selected from the group consisting of hydroperoxide, ferrous sulfate, and sodium metabisulfite; and a cross-linking agent including glyoxal.

In a case where the emulsion polymerization is performed in the presence of the persulfate-based polymerization initiator, a sulfate ion radical is changed into a hydroxyl radical in the presence of water. Since the hydroxyl radical is hydrophobic compared to the sulfate ion radical, the hydroxyl radical is polymerized in a particle, and in this case, oligomer production of the ethylenically unsaturated acid monomer and the water soluble monomer may be suppressed.

In the present invention, a persulfate initiator is added together with the initial activator including one or more selected from the group consisting of hydroperoxide, ferrous sulfate, and sodium metabisulfite, and the cross-linking agent including glyoxal to maximize production of the sulfate ion radical which is hydrophilic and to suppress a change of the sulfate ion radical into the hydroxyl radical, such that the production of the water soluble oligomer which is a polymer of the water soluble monomer and the ethylenically unsaturated acid monomer may be promoted.

As described above, in a case where an oligomer is produced from the ethylenically unsaturated acid monomer and the water soluble monomer at an initial stage of polymerization, the monomers are easily ionized in a final carboxylic acid-modified nitrile-based copolymer latex, such that the copolymer latex has a low pKa. A latex having a low pKa has excellent workability and high strength.

According to an exemplary embodiment of the present invention, in the polymerization, the persulfate-based polymerization initiator including one or more selected from the group consisting of sodium persulfate, potassium persulfate, and ammonium persulfate may be added in an amount of 0.1 parts by weight to 5 parts by weight, 0.1 parts by weight to 3 parts by weight, or 0.1 parts by weight to 2 parts by weight, with respect to the total of 100 parts by weight of the monomer mixture. Within these ranges, a polymerization rate may be appropriately adjusted, such that polymerization may be adjusted and also productivity of a carboxylic acid-modified nitrile-based copolymer may be excellent.

According to an exemplary embodiment of the present invention, in the polymerization, the initial activator including one or more selected from the group consisting of hydroperoxide, ferrous sulfate, and sodium metabisulfite may be added in an amount of 1 to 100 parts by weight, 25 parts by weight to 100 parts by weight, or 30 parts by weight to 100 parts by weight, with respect to a total content of 100 parts by weight of the persulfate-based polymerization initiator. Within these ranges, a reaction between the ethylenically unsaturated acid monomer and the water soluble monomer is further promoted to facilitate production of a water soluble oligomer.

According to an exemplary embodiment of the present invention, the carboxylic acid-modified nitrile-based copolymer latex may be prepared by emulsion polymerization by further adding an emulsifier, a chain transfer agent, or the like to the monomer mixture constituting the carboxylic acid-modified nitrile-based copolymer. In this case, in the polymerization, the monomer mixture may be added in the same type and content as those described above, and an addition method may be selected from a collective addition method, a continuous addition method, and a separate addition method.

In the preparation of the carboxylic acid-modified nitrile-based copolymer latex, various types of anionic emulsifiers and non-anionic emulsifiers may be used as the emulsifier to impart stability to a latex during the polymerization reaction and after the reaction. Examples of the anionic emulsifier may include alkyl benzene sulfonate such as sodium alkyl benzene sulfonate, alcohol sulfate, alcohol ether sulfonate, alkyl phenol ether sulfonate, alpha olefin sulfonate, paraffin sulfonate, ester sulfosuccinate, and phosphate ester. Examples of the non-anionic emulsifier may include alkyl phenol ethoxylate, fatty amine ethoxylate, fatty acid ethoxylate, and alkanoamide. These emulsifiers may be used alone and in combination of two or more thereof. In addition, the emulsifier may be added in an amount of 0.3 parts by weight to 10 parts by weight, 0.8 parts by weight to 8 parts by weight, or 1.5 parts by weight to 6 parts by weight, with respect to the total content of 100 parts by weight of the monomer mixture. Within these ranges, the polymerization stability may be excellent, and a molded article may be easily produced due to a small amount of foam.

In addition, in the preparation of the carboxylic acid-modified nitrile-based copolymer latex, examples of the chain transfer agent may include mercaptans such as α-methylstyrenedimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylenethiuram disulfide, and diisopropylxanthogen disulfide. These chain transfer agents may be used alone and in combination of two or more thereof. As a specific example, mercaptans may be used as the chain transfer agent. As a more specific example, t-dodecyl mercaptan may be used as the chain transfer agent. The chain transfer agent may be added in an amount of 0.1 parts by weight to 2 parts by weight, 0.2 parts by weight to 1.5 parts by weight, or 0.3 parts by weight to 1 part by weight, with respect to the total content of 100 parts by weight of the monomer mixture. Within these ranges, the polymerization stability is excellent, and physical properties of a molded article when producing the molded article after the polymerization are excellent.

In addition, according to an exemplary embodiment of the present invention, in the preparation of the carboxylic acid-modified nitrile-based copolymer latex, the polymerization may be performed in a medium such as water, as a specific example, deionized water. The polymerization may be performed by further including an additive such as a chelating agent, a dispersant, a pH adjuster, a deoxidizer, a particle size adjuster, an antioxidant, or an oxygen scavenger, if necessary, to ensure ease of polymerization.

According to an exemplary embodiment of the present invention, the emulsifier, the polymerization initiator, the chain transfer agent, the additive, and the like may be added at the same time, or separately added to a polymerization reactor, together with the monomer mixture, and each addition may be continuously performed.

According to an exemplary embodiment of the present invention, a subsidiary material such as a chelating agent, a dispersant, a pH adjuster, a deoxidizer, a particle size adjuster, an antioxidant, or an oxygen scavenger may be added, if necessary, when polymerizing the carboxylic acid-modified nitrile-based copolymer latex.

According to an exemplary embodiment of the present invention, a polymerization temperature during the emulsion polymerization may be, for example, 10° C. to 90° C., 20° C. to 80° C., or 25° C. to 75° C. Within these ranges, latex stability is excellent.

According to an exemplary embodiment of the present invention, the polymerization reaction may be terminated when a polymerization conversion rate reaches 90% or more, and more preferably 93% or more. The polymerization reaction may be terminated by addition of a polymerization inhibitor, a pH adjuster, or an antioxidant. The copolymer latex finally obtained after the termination of the reaction is used after removing unreacted monomers through a general deodorization and concentration process.

According to an exemplary embodiment of the present invention, a glass transition temperature of the carboxylic acid-modified nitrile-based copolymer latex may be −40° C. to −15° C., −40° C. to −20° C., or −35° C. to −20° C. When the glass transition temperature of the latex is within the above ranges, the tensile strength may be excellent, wearability may be excellent due to prevention of stickiness of a molded article, and durability may be excellent due to prevention of cracks of the molded article. The glass transition temperature of the latex may be adjusted by controlling the content of the conjugated diene-based monomer, and may be measured by differential scanning calorimetry.

An average particle size of the carboxylic acid-modified nitrile-based copolymer may be 80 nm to 300 nm, 80 nm to 280 nm, or 100 nm to 230 nm. The average particle size of the carboxylic acid-modified nitrile-based copolymer is adjusted to the above range, such that the tensile strength of the produced dip-molded article may be increased. The average particle size of the carboxylic acid-modified nitrile-based copolymer may be adjusted by controlling a type or content of the emulsifier, and may be measured by a laser scattering analyzer (Nicomp).

In addition, according to the present invention, a carboxylic acid-modified nitrile-based copolymer latex prepared according to the preparation method of the present invention is provided.

According to an exemplary embodiment of the present invention, the carboxylic acid-modified nitrile-based copolymer latex may include a carboxylic acid-modified nitrile-based copolymer including a conjugated diene-based monomer-derived repeating unit, an ethylenically unsaturated nitrile-based monomer-derived repeating unit, an ethylenically unsaturated acid monomer-derived repeating unit, and a glyoxal-derived part.

As described above, in a case where the carboxylic acid-modified nitrile-based copolymer latex includes the glyoxal-derived part, the cross-link density in the copolymer is increased by adequately adjusting the cross-link density of the copolymer, such that a molded article produced from the copolymer has improved tensile strength and an excellent elongation.

According to an exemplary embodiment of the present invention, the carboxylic acid-modified nitrile-based copolymer latex may include a carboxylic acid-modified nitrile-based copolymer including a conjugated diene-based monomer-derived repeating unit, an ethylenically unsaturated nitrile-based monomer-derived repeating unit, an ethylenically unsaturated acid monomer-derived repeating unit, a water soluble monomer-derived repeating unit, and a glyoxal-derived part. The pKa of the carboxylic acid-modified nitrile-based copolymer latex may be 8.5 to 9.5.

As described above, the carboxylic acid-modified nitrile-based copolymer latex according to the present invention has a low pKa, such that a latex composition for dip molding including the same may have excellent workability, and strength of a dip-molded article produced from the latex composition may be increased.

In addition, according to the present invention, a latex composition for dip molding including the carboxylic acid-modified nitrile-based copolymer latex according to the present invention is provided. According to an exemplary embodiment of the present invention, the latex composition for dip molding may be prepared by adding one or more additives selected from the group consisting of a vulcanizing agent, an ionic cross-linking agent, a pigment, a filler, a thickener, and a pH adjuster to the carboxylic acid-modified nitrile-based copolymer latex described above.

According to an exemplary embodiment of the present invention, the vulcanizing agent is used for vulcanizing the latex composition for dip molding, and may be sulfur, and as a specific example, the vulcanizing agent may be sulfur such as powdered sulfur, precipitated sulfur, colloidal sulfur, surface-treated sulfur, or insoluble sulfur. A content of the vulcanizing agent may be 0.1 parts by weight to 10 parts by weight, or 1 part by weight to 5 parts by weight, based on a total content of 100 parts by weight (based on a solid content) of the carboxylic acid-modified nitrile-based copolymer latex in the latex composition for dip molding. Within these ranges, cross-linking ability by vulcanization may be excellent.

In addition, according to an exemplary embodiment of the present invention, a vulcanization accelerator may be one or more selected from the group consisting of 2-mercaptobenzothiazole (MBT), 2,2-dithiobisbenzothiazole-2-sulfenamide (MBTS), N-cyclohexylbenzothiasole-2-sulfenamide (CBS), 2-morpholinothiobenzothiazole (MBS), tetramethylthiurammonosulfide (TMTM), tetramethylthiuram disulfide (TMTD), zinc diethyldithiocarbamate (ZDEC), zinc di-n-butyldithiocarbamate (ZDBC), diphenylguanidine (DPG), and di-o-tolylguanidine. A content of the vulcanization accelerator may be 0.1 parts by weight to 10 parts by weight, or 0.5 parts by weight to 5 parts by weight, based on the total content of 100 parts by weight (based on a solid content) of the carboxylic acid-modified nitrile-based copolymer latex in the latex composition for dip molding. Within these ranges, the cross-linking ability by vulcanization may be excellent.

In addition, according to an exemplary embodiment of the present invention, the zinc oxide forms ionic bonds with a carboxylic group of the carboxylic acid-modified nitrile-based copolymer in the latex composition for dip molding, and may be a cross-linking agent for forming a cross-linking part through ionic bonding in the carboxylic acid-modified nitrile-based copolymer or between the carboxylic acid-modified nitrile-based copolymers. A content of the zinc oxide may be 0.1 parts by weight to 5 parts by weight, or 0.5 parts by weight to 4 parts by weight, based on the total content of 100 parts by weight (based on a solid content) of the carboxylic acid-modified nitrile-based copolymer latex in the latex composition for dip molding. Within these ranges, the cross-linking ability is excellent, stability of the latex is excellent, and tensile strength and flexibility of the produced dip-molded article are excellent.

In addition, according to an exemplary embodiment of the present invention, the solid content (concentration) of the latex composition for dip molding may be 5 wt % to 40 wt %, 8 wt % to 35 wt %, or 10 wt % to 30 wt %. Within these ranges, latex transport efficiency is excellent, and an increase in viscosity of the latex is prevented, such that storage stability is excellent.

As another example, a pH of the latex composition for dip molding may be 9 to 12, 9 to 11.5, or 9.5 to 11. Within these ranges, processability and productivity when producing a dip-molded article may be excellent. The pH of the latex composition for dip molding may be adjusted by addition of the pH adjuster described above. Examples of the pH adjuster may include an aqueous potassium hydroxide solution having a concentration of 1 wt % to 5 wt %, and ammonia water having a concentration of 1 wt % to 5 wt %.

In addition, according to an exemplary embodiment of the present invention, the latex composition for dip molding may further include an additive such as a pigment such as titanium dioxide, a filler such as silica, a thickener, or a pH adjuster, if necessary.

In addition, according to the present invention, a dip-molded article is provided. The dip-molded article may be a dip-molded article produced by dip-molding the latex composition for dip molding, and may be a molded article including a layer derived from the latex composition for dip molding formed from the latex composition for dip molding by dip molding.

A method of producing the molded article may include dipping the latex composition for dip molding by a direct dipping method, an anode coagulation dipping method, a Teague's coagulation method, or the like. As a specific example, the molded article may be produced by an anode coagulation dipping method, and in this case, a dip-molded article having a uniform thickness may be obtained.

As a specific example, the method of producing the molded article may include: a step S100 of attaching a coagulant to a dip molding mold; a step S200 of dipping the dip molding mold to which the coagulant is attached into a latex composition for dip molding to form a layer derived from the latex composition for dip molding, that is, a dip-molded layer; and a step S300 of heating the dip-molded layer to cross-link the latex composition for dip molding.

According to an exemplary embodiment of the present invention, the step S100 is a step of dipping a dip molding mold into a coagulant solution to attach a coagulant to the dip molding mold so as to attach the coagulant to a surface of the dip molding mold. The coagulant solution is a solution obtained by dissolving a coagulant in water, alcohol, or a mixture thereof. A content of the coagulant in the coagulant solution may be 5 wt % to 75 wt %, 10 wt % to wt %, or 15 wt % to 55 wt %, with respect to a total content of the coagulant solution. The coagulant may be, for example, one or more selected from the group consisting of metal halide such as barium chloride, calcium chloride, magnesium chloride, zinc chloride, or aluminum chloride; nitrate such as barium nitrate, calcium nitrate, or zinc nitrate; acetate such as barium acetate, calcium acetate, or zinc acetate; and sulfate such as calcium sulfate, magnesium sulfate, or aluminum sulfate. As a specific example, the coagulant may be calcium chloride or calcium nitrate.

In addition, according to an exemplary embodiment of the present invention, the step S100 may further include a step of dipping the dip molding mold into the coagulant solution for 1 minute or longer to attach the coagulant to the dip molding mold, taking out the dip molding mold, and drying the dip molding mold at 70° C. to 150° C.

According to an exemplary embodiment of the present invention, the step S200 may be a step of dipping the dip molding mold to which the coagulant is attached into the latex composition for dip molding according to the present invention and taking out the dip molding mold to form a dip-molded layer in the dip molding mold. In addition, according to an exemplary embodiment of the present invention, in the step S200, the dipping may be performed for 1 minute or longer to form the dip-molded layer in the dip molding mold.

According to an exemplary embodiment of the present invention, the step S300 may be a step of heating the dip-molded layer formed in the dip molding mold to evaporate liquid components and cross-linking and curing the latex composition for dip molding so as to obtain a dip-molded article. In this case, in a case where the latex composition for dip molding according to the present invention is used, the latex composition for dip molding may be subjected to cross-linking by vulcanization and/or ion bonding of a cross-linking agent composition included in the latex composition for dip molding. In addition, according to an exemplary embodiment of the present invention, the heating may be performed by performing primary heating at 70° C. to 150° C. for 1 minute to 10 minutes and secondary heating at 100° C. to 180° C. for 5 minutes to 30 minutes.

According to an exemplary embodiment of the present invention, the molded article may be a glove such as a surgical glove, an examination glove, an industrial glove, or a household glove, a condom, a catheter, or a health care product.

Hereinafter, the present invention will be described in more detail by examples. However, the following examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of Carboxylic Acid-Modified Nitrile-Based Copolymer Latex>

To a polymerization reactor, a monomer mixture including 28 wt % of acrylonitrile, 64.2 wt % of 1,3-butadiene, 5.8 wt % of methacrylic acid, and 2 wt % of hydroxyethyl methacrylate, and t-dodecyl mercaptan, sodium dodecylbenzenesulfonate, potassium persulfate, hydroperoxide, glyoxal, and water were added in amounts of 0.6 parts by weight, 2 parts by weight, 0.3 parts by weight, 0.1 parts by weight, 0.5 parts by weight, and 140 parts by weight, respectively, with respect to 100 parts by weight of the monomer mixture, and polymerization was initiated at a temperature of 37° C.

When a polymerization conversion rate reached 94%, 0.3 parts by weight of ammonium hydroxide was added to terminate the polymerization. Thereafter, unreacted materials were removed through a deodorization process, and ammonia water, an antioxidant, and a defoaming agent were added to obtain a carboxylic acid-modified nitrile-based copolymer latex having a solid content concentration of 45% and a pH of 8.5.

<Preparation of Latex Composition for Dip Molding>

To 100 parts by weight (based on a solid content) of the obtained carboxylic acid-modified nitrile-based copolymer latex, 1 part by weight of sulfur, 0.7 parts by weight of zinc di-n-butyldithiocarbamate (ZDBC), 1.5 parts by weight of zinc oxide, and 1 part by weight of titanium oxide, an aqueous potassium hydroxide solution, and secondary distilled water were added to obtain a latex composition for dip molding having a solid content concentration of 16 wt % and a pH of 10.

<Production of Dip-Molded Article>

13 wt % of calcium nitrate, 86.5 wt % of water, and 0.5 wt % of a wetting agent (trade name: Teric 320, produced by Huntsman Corporation, Australia) were mixed with each other to prepare a coagulant solution, a hand-shaped ceramic mold was dipped into the solution and taken out from the solution, and the hand-shaped mold was dried at 80° C. for 3 minutes, thereby applying a coagulant to the hand-shaped mold.

Subsequently, the hand-shaped mold to which the coagulant was applied was dipped into the obtained latex composition for dip molding for 1 minute and taken out from the latex composition, the hand-shaped mold was dried at 80° C. for 1 minute, and the dried hand-shaped mold was dipped into water for 3 minutes. The hand-shaped mold was dried again at 80° C. for 3 minutes, and then was subjected to cross-linking at 125° C. for 20 minutes. Thereafter, the dip-molded layer subjected to the cross-linking was removed from the hand-shaped mold, thereby obtaining a dip-molded article having a glove shape.

Example 2

Example 2 was performed in the same manner as that of Example 1, except that glyoxal was added in an amount of 0.1 parts by weight instead of 0.5 parts by weight in the preparation of the carboxylic acid-modified nitrile-based copolymer latex of Example 1.

Example 3

Example 3 was performed in the same manner as that of Example 1, except that glyoxal was added in an amount of 1 part by weight instead of 0.5 parts by weight in the preparation of the carboxylic acid-modified nitrile-based copolymer latex of Example 1.

Example 4

Example 4 was performed in the same manner as that of Example 1, except that glyoxal was added in an amount of 0.05 parts by weight instead of 0.5 parts by weight in the preparation of the carboxylic acid-modified nitrile-based copolymer latex of Example 1.

Example 5

Example 5 was performed in the same manner as that of Example 1, except that glyoxal was added in an amount of 1.5 parts by weight instead of 0.5 parts by weight in the preparation of the carboxylic acid-modified nitrile-based copolymer latex of Example 1.

COMPARATIVE EXAMPLES

Comparative Example 1

Comparative Example 1 was performed in the same manner as that of Example 1, except that 0.5 parts by weight of glyoxal was not added in the preparation of the carboxylic acid-modified nitrile-based copolymer latex of Example 1.

Comparative Example 2

Comparative Example 2 was performed in the same manner as that of Example 1, except that 0.1 parts by weight of hydroperoxide as an initial activator was not added in the preparation of the carboxylic acid-modified nitrile-based copolymer latex of Example 1.

EXPERIMENTAL EXAMPLES

Experimental Example 1

Physical properties of the copolymer latex prepared in each of the examples and the comparative examples were measured under the following conditions. The results are shown in Tables 1 and 2 and illustrated in FIGS. 1 and 2.

Measurement of pKa of copolymer latex: A degree of ionization of unsaturated acid monomers present in a copolymer latex is determined by a pKa. In a case where the pKa is low, the amount of unsaturated acid monomers saponified at a pH when producing a glove is increased, such that a glove having excellent workability and high strength may be produced. The pKa of the latex was measured by the following method. The latex obtained by polymerization was diluted to 10%, a pH of the latex was increased to 12 by using a 3% aqueous potassium hydroxide solution, and the mixed solution was stirred at 90° C. for 2 hours. Subsequently, ammonia in the solution was removed, the obtained diluted solution was cooled to room temperature, a pH of the solution was decreased to 2 or less by using a 2% diluted aqueous hydrochloric acid solution, and the solution was stirred at a temperature of 90° C. for 2 hours. Next, carbon dioxide in the aqueous solution was removed, the obtained diluted solution was cooled to room temperature, and an acid-base titration graph was obtained by using an aqueous potassium hydroxide solution having a concentration of exactly 3%. The results are illustrated in FIGS. 1 and 2.

FIG. 1 is a graph showing a pH change according to an addition amount of KOH in Example 1 of the present invention. The amount of carboxylic acid calculated by the addition amount of KOH between the first inflection point and the second inflection point in FIG. 1 is the amount of acid present on a surface. FIG. 2 is a derivative curve of the addition amount of KOH according to the pH illustrated in FIG. 1. The vertex of the quadratic function is a pKa of the latex. It can be confirmed from the graph that the copolymer latex prepared in Example 1 has a pKa of 8.5 to 9.5.

Experimental Example 2

Physical properties of the latex composition for dip molding and dip-molded article produced in each of the examples and the comparative examples were measured under the following conditions. The results are shown in Tables 1 and 2.

Tensile strength, elongation, stress (modulus) at elongation of 300%: Dumbbell-shaped specimens were prepared from the dip-molded article according to ASTM D-412. Subsequently, the specimens were pulled at a stretching speed of 500 mm/min, and stress at an elongation of 300%, and tensile strength and elongation at break were measured.

Measurement of syneresis: A hand-shaped ceramic mold was dipped into the coagulant solution used in the production of the dip-molded article for 1 minute, and the hand-shaped mold was taken out and dried at 80° C. for 3 minutes, thereby applying a coagulant to the hand-shaped mold. Thereafter, the hand-shaped mold to which the coagulant was applied was dipped into the latex composition for dip molding of each of the examples and the comparative examples for 1 minute, the hand-shaped mold was taken out, and then the time taken for droplets to fall out of the hand-shaped mold was measured. The case where the droplets did not fall within 5 minutes was marked with X.

Appearance: In a case where workability of the dip-molded article is poor, a flow mark occurs on the glove. After confirmed the appearance of the glove, a case where the flow mark was observed was marked with X, and a case where workability was excellent without the flow mark was marked with ○.

TABLE 1

| | | Example | | | | |
|---|---|---|---|---|---|---|
| Classification | | 1 | 2 | 3 | 4 | 5 |
| Content of glyoxal | Parts by weight | 0.5 | 0.1 | 1 | 0.05 | 1.5 |
| Content of potassium persulfate | Parts by weight | 0.3 | 0.3 | 0.3 | 0.3 | 0.3 |
| Content of hydroperoxide | Parts by weight | 0.1 | 0.1 | 0.1 | 0.1 | 0.1 |
| Physical properties of latex | pKa | 9.2 | 9.1 | 9.1 | 9.0 | 9.1 |
| Tensile properties | Tensile strength | MPa | 34.3 | 38 | 35 | 29 | 30 |
| | Elongation | % | 620 | 650 | 580 | 641 | 576 |
| | Modulus of 300% | MPa | 6.9 | 6.3 | 8.6 | 6.0 | 9.2 |

TABLE 1-continued

| Classification | | | Example | | | | |
| --- | --- | --- | --- | --- | --- | --- | --- |
| | | | 1 | 2 | 3 | 4 | 5 |
| Workability | Syneresis | Min | X | X | X | X | X |
| | Physical properties of appearance | — | ○ | ○ | ○ | ○ | ○ |

TABLE 2

| Classification | | Comparative Example | |
| --- | --- | --- | --- |
| | | 1 | 2 |
| Content of glyoxal | Parts by weight | 0 | 0.5 |
| Content of potassium persulfate | Parts by weight | 0.3 | 0.3 |
| Content of hydroperoxide | Parts by weight | 0.1 | 0 |
| Physical properties of latex | pKa | 9.6 | 9.7 |
| Tensile properties | Tensile strength MPa | 29 | 30 |
| | Elongation % | 650 | 598 |
| | Modulus of 300% MPa | 5.2 | 6.9 |
| Workability | Syneresis Min | 2 | 1 |
| | Physical properties of appearance — | X | X |

Referring to Tables 1 and 2, it could be confirmed that in Examples 1 to 5 in which all of glyoxal, potassium persulfate as a polymerization initiator, and hydroperoxide as an initial activator were added when preparing the carboxylic acid-modified nitrile-based copolymer latex, a pKa of the latex was low, the workability of the composition for dip molding was excellent, and the tensile strength of the dip-molded article was excellent, as compared to Comparative Example 1 in which glyoxal was not added and to Comparative Example 2 in which an initial activator was not added.

The invention claimed is:

1. A method of preparing a carboxylic acid-modified nitrile-based copolymer latex, comprising emulsion-polymerizing a monomer mixture including a conjugated diene-based monomer, an ethylenically unsaturated nitrile-based monomer, and an ethylenically unsaturated acid monomer in the presence of a cross-linking agent including glyoxal.

2. The method of claim 1, wherein the monomer mixture includes a water soluble monomer.

3. The method of claim 2, wherein the emulsion polymerization is performed in the presence of a persulfate-based polymerization initiator including sodium persulfate, potassium persulfate, or ammonium persulfate; and an initial activator including hydroperoxide, ferrous sulfate, or sodium metabisulfite.

4. The method of claim 1, wherein the conjugated diene-based monomer includes 1,3-butadiene, 2,3-dimethyl-1,3-butadiene, 2-ethyl-1,3-butadiene, 1,3-pentadiene, or isoprene.

5. The method of claim 1, wherein the ethylenically unsaturated nitrile-based monomer includes acrylonitrile, methacrylonitrile, fumaronitrile, α-chloronitrile, or α-cyanoethylacrylonitrile.

6. The method of claim 1, wherein the ethylenically unsaturated acid monomer includes acrylic acid, methacrylic acid, itaconic acid, maleic acid, fumaric acid, maleic anhydride, citraconic anhydride, styrenesulfonic acid, monobutyl fumarate, monobutyl maleate, or mono-2-hydroxypropyl maleate.

7. The method of claim 2, wherein the water soluble monomer includes hydroxyethyl acrylate, hydroxyethyl methacrylate, hydroxypropyl methacrylate, dimethylaminoethyl acrylate, or diethylaminoethyl methacrylate.

8. The method of claim 3, wherein a content of the persulfate-based polymerization initiator is 0.1 to 2 parts by weight with respect to a total of 100 parts by weight of the monomer mixture.

9. The method of claim 3, wherein a content of the initial activator is 1 to 100 parts by weight with respect to a content of 100 parts by weight of the persulfate-based polymerization initiator.

10. The method of claim 1, wherein a content of the cross-linking agent is 0.1 to 1 parts by weight with respect to a total of 100 parts by weight of the monomer mixture.

11. A carboxylic acid-modified nitrile-based copolymer latex comprising a carboxylic acid-modified nitrile-based copolymer including a conjugated diene-based monomer-derived repeating unit, an ethylenically unsaturated nitrile-based monomer-derived repeating unit, an ethylenically unsaturated acid monomer-derived repeating unit, and a glyoxal-derived part.

12. A carboxylic acid-modified nitrile-based copolymer latex comprising a carboxylic acid-modified nitrile-based copolymer including a conjugated diene-based monomer-derived repeating unit, an ethylenically unsaturated nitrile-based monomer-derived repeating unit, an ethylenically unsaturated acid monomer-derived repeating unit, a water soluble monomer-derived repeating unit, and a glyoxal-derived part,
wherein a pKa is 8.5 to 9.5.

13. A latex composition for dip molding comprising the carboxylic acid-modified nitrile-based copolymer latex of claim 11.

14. A dip-molded article comprising a layer derived from the latex composition for dip molding of claim 13.

* * * * *